United States Patent [19]

Vo

[11] 4,376,640
[45] Mar. 15, 1983

[54] REPRESSURIZATION OF PRESSURE SWING ADSORPTION SYSTEM

[75] Inventor: Toan P. Vo, Pittsburgh, Pa.

[73] Assignee: Calgon Corporation, Robinson Township, Allegheny County, Pa.

[21] Appl. No.: 329,145

[22] Filed: Dec. 10, 1981

[51] Int. Cl.³ .............................................. B01D 53/04
[52] U.S. Cl. ........................................ 55/26; 55/58; 55/62; 55/68; 55/75
[58] Field of Search ................... 55/18, 25, 26, 33, 58, 55/62, 68, 74, 75

[56] References Cited

U.S. PATENT DOCUMENTS

| | | | |
|---|---|---|---|
| 3,164,454 | 1/1965 | Wilson | 55/58 X |
| 3,176,444 | 4/1965 | Kiyonaga | 55/62 X |
| 3,636,679 | 1/1972 | Batta | 55/26 |
| 3,801,513 | 4/1974 | Munzner et al. | 55/75 X |
| 3,891,411 | 6/1975 | Meyer | 55/26 |
| 3,923,477 | 12/1975 | Armond et al. | 55/25 |
| 3,944,400 | 3/1976 | Bird | 55/21 |
| 3,989,484 | 11/1976 | Hamrin, Jr. et al. | 55/58 |
| 4,011,065 | 3/1977 | Munzner et al. | 55/58 X |
| 4,077,780 | 3/1978 | Doshi | 55/26 |
| 4,264,339 | 4/1981 | Juntgen et al. | 55/25 |
| 4,299,596 | 11/1981 | Benkmann | 55/26 |
| 4,326,858 | 4/1982 | Benkmann | 55/26 |

Primary Examiner—Robert H. Spitzer
Attorney, Agent, or Firm—Martin L. Katz; Ernest V. Linek

[57] ABSTRACT

Gaseous mixtures are separated on a two adsorption zone carbon molecular sieve pressure swing adsorption system each zone consisting of either one or two adsorption columns. This process includes the pressurization of an adsorption zone with lean gas in the range of 70 to 120 percent of the adsorption pressure.

5 Claims, 2 Drawing Figures

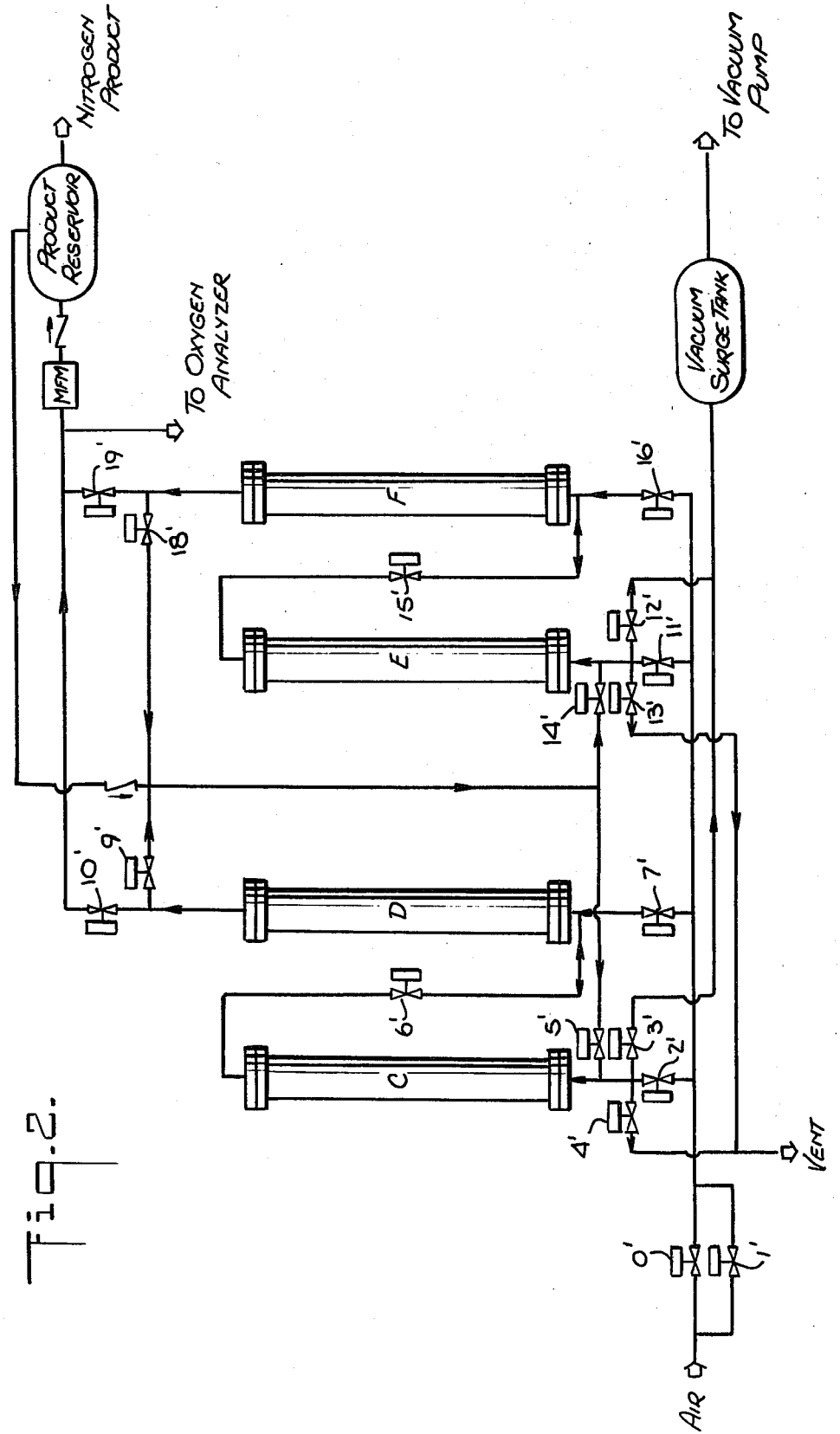

REPRESSURIZATION OF PRESSURE SWING ADSORPTION SYSTEM

BACKGROUND OF THE INVENTION

This invention relates to a method for obtaining in large volume a gas stream that is 90%–99% and higher by volume in one component of a gaseous mixture. This invention especially relates to an adsorption process for providing a gas stream enriched in at least one component by means of a pressure swing adsorption system using carbon molecular sieves. More particularly, this invention relates to a method for providing an inexpensive and high volume source of gases such as nitrogen, hydrogen or methane, requiring less energy to operate than either cryogenic or other pressure swing adsorption systems, and yet supplying gases of comparable quality.

The term gaseous mixture, as used herein, refers to air and other gas mixtures primarily comprised of two components of different molecular size. The term enriched gas refers to a gas comprised of the component(s) of the gaseous mixture relatively unadsorbed after passage of the gaseous mixture through an adsorbent that meets a predetermined purity of, for example, from 90 to 99% in one component. The term lean gas refers to that gas exiting from an adsorption zone that fails to meet the purity standard set for the enriched gas. In the case of a two (or more) column adsorption zone, lean gas is that gas passing solely through the last column comprising the zone as well as gas that fails to meet the purity standard set for enriched gas.

A gaseous mixture may be fractionated, or separated, using pressure swing adsorption by passing the mixture at an elevated pressure through a bed of adsorbent which is selective in its capacity to adsorb one or more of the components of the mixture. This selectivity is governed by the pore size distribution in the adsorbent and the pore volume of the proper pore size for adsorption of a particular gas component. Thus, gas molecules with a kinetic diameter less than or equal to the pore size are retained, or adsorbed, on the adsorbent while gas molecules of larger diameters pass through the column. The adsorbent, in effect, sieves the gas according to its molecular size. The gas mixture may also be fractionated because of different rates of diffusion of its components into the pore system of the adsorbent.

As the gas travels through the adsorbent column, the adsorbent pores are filled with gas molecules. One can envision an adsorption front, moving through the column, akin to the liquid adsorption front moving through a solid adsorbent in a column chromatography system. After some time the gas exiting the column is essentially the same in composition as the gas that entered the column of the adsorbent. This is known as the breakthrough point. For example, a gaseous mixture enters the adsorbent, and the identical mixture exits the adsorbent. At some time prior to this breakthrough point, the adsorbent must be regenerated.

After treatment of the gas mixture to adsorb selected components therefrom, the flow of the gaseous mixture through the column is interrupted and the adsorbent is regenerated by purging it of the adsorbed components either by vacuum or by passing through the column, generally in the opposite direction of flow taken by the gaseous mixture (i.e., countercurrently), a purge gas stream which may comprise a portion of the purified product.

Pressure swing adsorption usually includes at least two columns of adsorbent so that while one column is being regenerated, the other is in the adsorption phase producing product gas, that is, the columns interact as two alternating adsorption zones.

More than one column may be employed in an adsorption zone. When more than one column comprises such a zone, the columns may be connected in either a serial or a parallel arrangement. When adsorbent columns are connected in series, gas exiting one column of the zone enters the inlet end of the next column comprising the zone. In a parallel arrangement, the gas mixture enters the inlet end of all columns comprising the zone. Generally, a serial arrangement is preferred for high purification, while a parallel arrangement allows for large quantities of product gas in a short time cycle. As used herein, the term adsorption zone is understood to refer either to a single column zone or a serially arranged two column zone. In either case, each adsorption zone has an inlet end, for example, the inlet of a single column zone is that one column's inlet end, and for a two column zone (arranged in series) the inlet end is at the inlet of the first column in the zone. Each adsorption zone has a corresponding outlet end. For the two column zone, this is at the outlet end of the second column comprising the zone. When using two adsorption zones, by cycling (alternating) between these adsorption zones, product gas is obtained constantly.

A known process is the use of carbon molecular sieves for the production of enriched nitrogen from air. See for example Vesterdal, U.S. Pat. No. 2,556,859 and Munzner et al., U.S. Pat. No. 3,960,522. These sieves possess a pore structure with a size comparable to the kinetic diameter of oxygen. When used in a pressure swing adsorption system, these sieves selectively adsorb oxygen from a gas mixture, allowing other components especially nitrogen to pass.

A four column pressure swing adsorption unit has been successfully employed in the separation of hydrogen gas from its mixture with carbon dioxide, water and light aliphatic hydrocarbons. See for example, Wagner in U.S. Pat. No. 3,430,418.

Also known is the fractionation of other binary gas mixtures by pressure swing adsorption. For example, carbon monoxide from its mixture with hydrogen using zeolite 13X and carbon dioxide from its mixture with fuel gas mixtures using charcoal, alumina or silica. See, Simonet, U.S. Pat. No. 3,884,661.

Binary gas mixtures of argon and oxygen or helium and methane have been separated on an adsorbent of partially oxidized carbon in a pressure swing adsorption process. See, German Auslegungsschfrift No. 2,045,200.

Typical problems in the present pressure swing adsorption and carbon molecular sieve technologies include; low yield of product gas, large amounts of molecular sieve required and energy inefficient regeneration methods.

SUMMARY OF THE INVENTION

There is thus provided an adsorption process for the generation of a stream of enriched gas which comprises the sequential steps of passing a gaseous mixture at one pressure selected from the range of from 3.0 to 8.0 bars, referred to herein as the adsorption pressure, through one adsorption zone consisting of one or two columns, yielding enriched gas, prior to breakthrough, passing the gaseous mixture solely through the last column of this first adsorption zone (in a two column zone), thereby producing lean gas and passing said lean gas from the outlet end of said first adsorption zone into the inlet end of a second adsorption zone consisting of either one or two columns to pressurize the second adsorption zone in a range of 70 to 120% of the selected adsorption pressure, in the case of a two column adsorption zone, isolating (closing off) the first column of said zone from the system and in the case of a single column zone, isolating said single column and, allowing the second adsorption zone to decrease in pressure by a time delay, wherein the natural adsorption by the carbon causes the pressure drop, while simultaneously venting the isolated column of the first adsorption zone to atmospheric pressure, and, in the case of a two column zone countercurrently venting the second column of the first adsorption zone, using said vented gas to countercurrently purge the previously vented and isolated column in the zone, thereafter passing the gaseous mixture through the pressurized second adsorption zone at the selected adsorption pressure to yield enriched gas while regenerating the entire first adsorption zone by the use of vacuum applied to the inlet end of the zone in the range of 70 to 250 torr and repeating the cycle upon reaching an undesirable level of previously adsorbed (unwanted) gas in the enriched gas stream, that is, prior to breakthrough.

The object of this invention is to provide a novel method of repressurization for a two adsorption zone pressure swing adsorption system containing molecular sieve carbon as the adsorbent. This method provides a good yield of enriched gas in addition to overcoming the prior art problems regarding energy consumption in the regeneration of the adsorbent.

BRIEF DESCRIPTION OF THE DRAWING

FIG. 2 is a schematic representation of a double column adsorption zone apparatus capable of employing the novel repressurization process described herein.

DETAILED DESCRIPTION

Figure 1:
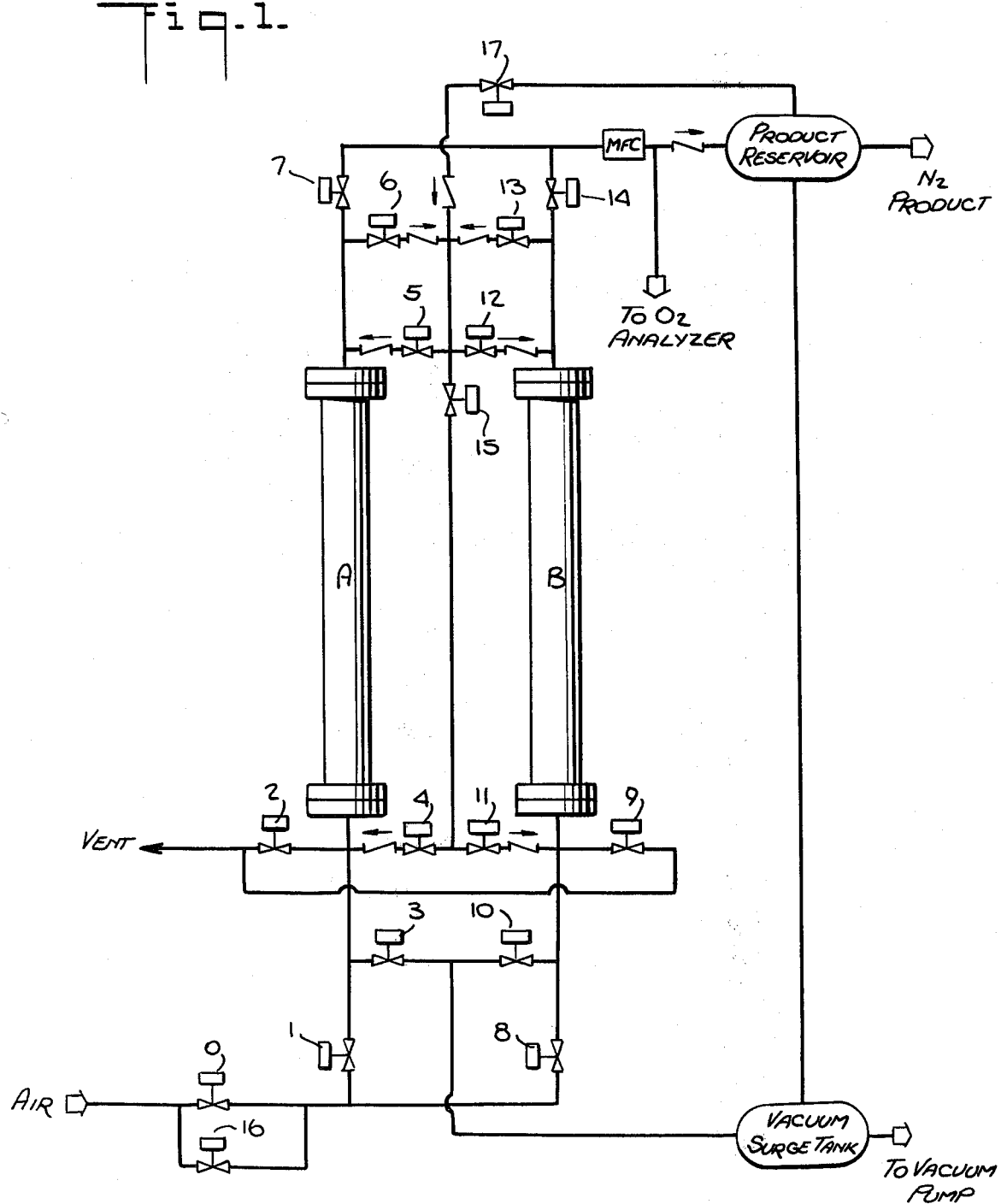
FIG. 1 is a schematic representation of a single column adsorption zone apparatus capable of employing the novel repressurization process described herein.

The system for employing the novel repressurization technique of this invention can be better understood by reference to the accompanying drawings which show two pressure swing adsorption units capable of fractionating a gaseous mixture in accordance with this invention. Although the present invention is described and illustrated in connection with two preferred embodiments, it is to be understood that modifications and variations may be used without departing from the spirit of the invention. For example, any gaseous mixture including, but not limited to, air (nitrogen and oxygen), methane and carbon dioxide, or hydrogen and carbon monoxide will suffice.

Refering to FIG. 1 in detail, there is shown two pressure resistant columns A and B, each of which is filled with carbon molecular sieves suitable for the fractionation of nitrogen from air. A typical useful carbon molecular sieve for this process is described in Jüntgen et al., U.S. Pat. No. 4,124,529. Column A comprises the first adsorption zone (zone-1) while column B comprises the second adsorption zone (zone-2). Each zone has an inlet and an outlet end.

The series of valves connecting the pressure resistant columns may be defined by the number shown in FIG. 1 and described by the function performed in this first preferred arrangement:

| | | |
|---|---|---|
| (a) | Valves 0 & 16 | main air flow valves |
| (b) | Valves 1 & 8 | inlet air valves to zones 1 & 2 |
| (c) | Valves 3 & 10 | regeneration valves, vacuum line for zones 1 & 2 |
| (d) | Valves 2 & 9 | vent valves - release pressure from zones 1 & 2 |
| (e) | Valves 7 & 14 | product (enriched) gas flow from zones 1 & 2 |
| (f) | Valves 17, 5 & 12 | enriched gas connection to zones 1 & 2 for purging |
| (g) | Valves 6, 15, 11 & 13, 15, 4 | lean gas connection between zones 1 & 2 for repressurization |

While housings A and B are shown in the vertical position, they may be installed in either the horizontal or vertical position without adverse effect to the mode of operation.

Ambient air is compressed and dried and introduced into the system via either valve 0 or valve 16. The ambient air may be modified, prior to adsorption, by passing it through a condenser to remove excess humidity as a relative humidity of less than 40% is preferred. Also, a filter or scrubber may be employed to remove other gasses such as carbon dioxide, sulfur dioxide or oxides of nitrogen. These steps improve the purity of the enriched gas stream and are employed when the specification for extremely pure enriched gas (e.g., nitrogen) mandates such prior removal. They are however auxiliary and not requisite to the successful operation of this invention.

Air is admitted to either zone—1 or zone—2 at the adsorption pressure via valve 0 and either valve 1 or valve 8 to selectively sieve oxygen and the feed air is pushed through the adsorption zone. Enriched product nitrogen gas is discharged from zone—1 or zone—2 via either valve 7 or valve 14 respectively.

A stream of product nitrogen gas is discharged from the product reservoir at a pressure below that of the adsorption pressure to keep its pressure constant. The instantaneous nitrogen flow rate is measured by a mass flow meter and the enriched gas oxygen content is analyzed upstream from the product reservoir.

When one adsorption zone is generating enriched gas, the other zone is being regenerated by vacuum applied via valves 3 or 10. Thus, while zone—1 is producing enriched nitrogen via open valves 0, 1, and 7, zone—2 is being regenerated by vacuum in the range of 70 to 250 torr via open valve 10.

When analysis of the enriched nitrogen gas oxygen content shows that an undesirable level of oxygen, for example, greater than from 1 to 10 percent, has been reached valves 0, 1, and 7 or valves 0, 8, and 14 are closed. Thus, the production lines are closed. Feed air is then admitted into zone—1 or zone—2 (column D) via valves 16 and 1 or 16 and 8 respectively. The exiting lean gas from this column flows through either valves 6, 15 and 11 or valves 13, 15 and 4 to the inlet end of zone—2 or zone—1. This lean gas is used to pressurize the other zone to a range of 70 to 120%, preferably 80 to 105%, of the adsorption pressure. The zone used to accomplish this ultra pressurization is then isolated (closed-off) from the system. After this step the ultra pressurized zone is allowed to decrease in pressure by a time delay action and through spontaneous adsorption of gas molecules by the molecular sieve carbon. Generally this pressure drop occurs in about 1 to 60 seconds. During this time the isolated adsorption zone is returned to atmospheric pressure by venting either through valves 2 or 9. The adsorption zone which has experienced the time delay now receives feed air via valve 0 and either valve 8 or valve 1 and product gas is released via valves 14 or 7. While one adsorption zone is producing enriched nitrogen gas, the other adsorption zone is being regenerated by the application of vacuum in the range of 70 to 250 torr via valve 3 or valve 10. The cycle is repeated when the oxygen content of the product gas from the second adsorption zone again reaches an undesirable level.

Referring to FIG. 2 in detail, there is shown four pressure resistant columns C, D and E and F, each of which is filled with a bed of carbon molecular sieves suitable for the fractionation of nitrogen from air. Columns C & D comprise the first adsorption zone (zone-1) while columns E & F comprise the second adsorption zone (zone-2). Each zone has an inlet end (zone-1=Column C, zone-2=Column E) and an outlet end (zone-1=Column D, zone-2=Column F).

The series of valves connecting the pressure resistant columns may be defined by the number shown in FIG. 2 and described by the function performed in this second preferred arrangement:

| (a) | Valves 0' & 1' | main air flow valves |
|---|---|---|
| (b) | Valves 2', 7' & 11', 16' | inlet air valves to columns C, D & E, F respectively. |
| (c) | Valves 3', & 12' | regeneration valves - vacuum pump for zones 1 & 2 |
| (d) | Valves 4', & 13' | purge valves - release column pressure for zones 1 & 2 |
| (e) | Valves 10' & 19' | product flow valves - from adsorption zones 1 & 2 |
| (f) | Valves 9', 14', 15' & 5', 6', & 18' | exiting (lean) gas connection between outlet of first adsorption zone and inlet of second adsorption zone |
| (g) | Valves 6' & 15' | zone purge connection - gas from second half of zone used to purge first half. |

While Columns C, D, E and F are shown in the vertical position, they may be installed in either the horizontal or vertical position without adverse effect to the mode of operation.

Ambient air is dried and compressed and introduced into the system via either valve 0' or valve 1'. The ambient air may be modified, prior to adsorption, by passing it through a condenser to remove excess humidity as a relative humidity of less than 40% is preferred. Also, a filter or scrubber may be employed to remove other gasses such as carbon dioxide, sulfur dioxide or oxides of nitrogen. These steps improve the purity of the exiting gas stream and are employed when the specification for essentially pure enriched gas, (e.g., nitrogen) mandates such prior removal. They are however auxiliary and not requisite to the successful operation of this invention.

Air is admitted to either zone—1 or zone—2 at the desired adsorption pressure of, for example, 7 bars, via valve 0' and either valves 2' & 6' or valves 11' & 15' to selectively sieve oxygen and the feed air is pushed through the adsorption zone. Enriched product nitrogen gas is discharged from zone—1 or zone—2 via either valve 10' or valve 19' respectively. The instantaneous enriched nitrogen flow rate is measured by a mass flow meter and the enriched gas oxygen content is analyzed upstream from the product reservoir. A stream of enriched product nitrogen gas is discharged from the product reservoir at a pressure below that of the adsorption pressure to keep its pressure constant.

When one adsorption zone is generating enriched gas, the other zone is being regenerated by vacuum applied via valves 3' or 12'. Thus, while zone—1 is producing nitrogen via open valve 0', 2', 6' and 10', zone—2 is being regenerated by vacuum in the range of 70 to 250 torr via open valve 12.

When analysis of the enriched product nitrogen gas oxygen content shows that an undesirable level of oxygen, for example, greater than from 1 to 10 percent, has been reached valves 0', 2', 6', and 10' or valves 0', 11', 15' and 19' are closed. The first column in the adsorption zone (column C or E) is then isolated (closed-off) from the system. Air is then admitted solely into the second column of zone—1 (column D) or zone—2 (column F) via valves 1' and 7' or 1' and 16' respectively. The exiting lean gas from this column flows through either valves 9', 14' and 15' or valves 18', 5' and 6' to the inlet end of zone—2 or zone—1. This lean gas is used to pressurize the other zone to a range of 70-120%, preferably 80 to 105% of the adsorption pressure. After this step the zone is allowed to decrease in pressure by a time delay. The pressure drop occurs due to spontaneous adsorption by the carbon molecular sieves of some of the gas molecules. Generally, this pressure drop occurs in about 2 to 60 seconds. During this time the isolated column of the first adsorption zone is returned to atmospheric pressure by venting through valves 3', 4' or 13'. Once the repressurization phase is completed, the second column of the adsorption zone (i.e., Column D, or Column F) is countercurrently depressurized via valve 6' or valve 15' and the previously vented and isolated column (i.e., column C or column E) is purged with the residual gas from the second column in the zone. The adsorption zone that has decreased in pressure during the time delay process now receives feed air via valve 0' and either valve 11', 15' or valve 2', 6' and enriched product gas is released via valves 19' or 10'. While one adsorption zone is producing enriched nitrogen gas, the other adsorption zone is being regenerated by the application of vacuum in the range of 70 to 250 torr via valve 3' or valve 12'. The cycle is repeated when the oxygen content of the enriched product gas from the second adsorption zone again reaches a predetermined undesirable level.

What is claimed is:

1. An adsorption process for producing an enriched gas stream of a predetermined purity which comprises the sequential steps of:
   (a) passing a gaseous mixture, at an adsorption pressure selected from the range of from 3.0 to 8.0 bars through a first adsorption zone comprising one column of carbon molecular sieves to yield enriched gas passing said enriched gas to a product reservoir;

(b) when said enriched gas declines in purity by from 1 to 10 percent below said predetermined purity, thereby becoming lean gas, passing said lean gas from the outlet end of said first adsorption zone into the inlet end of a second adsorption zone comprising one column of carbon molecular sieves, to pressurize said second adsorption zone in the range of about 70 to 120% of said adsorption pressure, thereafter halting said lean gas flow and isolating said first adsorption zone;

(c) allowing said second adsorption zone to decrease in pressure via a time delay process while concomitantly venting said isolated first adsorption zone to the atmosphere through its inlet end;

(d) thereafter passing said gaseous mixture through said pressurized second adsorption zone at the adsorption pressure to yield enriched gas while regenerating said isolated and vented first adsorption zone by application of vacuum to the inlet end of said first zone in the range of from 70 to 250 torr;

(e) repeating the cycle, treating said second zone as said first zone when the enriched gas quality declines in purity by from 1 to 10 percent below said predetermined purity.

2. An adsorption process for producing an enriched gas stream of a predetermined purity which comprises the sequential steps of:

(a) passing a gaseous mixture, at an adsorption pressure selected from the range of from 3.0 to 8.0 bars through a first adsorption zone comprising a first and a last column of carbon molecular sieves arranged in series to yield said enriched gas;

(b) when the enriched gas declines in purity by from 1 to 10 percent below said predetermined purity, passing the gaseous mixture solely through the last column of said first adsorption zone, thereby producing lean gas and passing said lean gas from the outlet end of said first adsorption zone into the inlet end of a second adsorption zone comprising a first and a last column of carbon molecular sieves arranged in series, to pressurize said second adsorption zone in the range of about 70 to 120% of said adsorption pressure, halting said lean gas flow and thereafter isolating said first adsorption column of said first adsorption zone;

(c) allowing said second adsorption zone to decrease in pressure via a time delay process while concomitantly venting said first column of said first adsorption zone to atmospheric pressure through its inlet end, and countercurrently venting said last column of said first adsorption zone and using said vented gas to countercurrently purge the previously vented and isolated first column in said first adsorption zone;

(d) thereafter passing said gaseous mixture through said second adsorption zone at the adsorption pressure to yield enriched gas while regenerating said first adsorption zone by application of vacuum to the inlet end of said first zone in the range of 70 to 250 torr;

(e) repeating the cycle, treating said second zone as said first zone when the enriched gas purity declines by from 1 to 10 percent below said predetermined purity.

3. The adsorption process of claim 1 wherein the gaseous mixture is air and the enriched gas is from 90 to 99 percent nitrogen.

4. The adsorption process of claims 1 or 2 wherein the lean gas is admitted to pressurize the second adsorption zone to about 105% of the adsorption pressure.

5. The adsorption process of claims 1 or 2 wherein enriched gas purity of below 5 percent of said predetermined purity is lean gas.

* * * * *